United States Patent
Shen et al.

(10) Patent No.: US 9,654,437 B2
(45) Date of Patent: May 16, 2017

(54) SYSTEM AND METHOD FOR PRIORITIZING MESSAGES BASED ON SENDERS AND CONTENT FOR DRIVERS

(71) Applicant: Palo Alto Research Center Incorporated, Palo Alto, CA (US)

(72) Inventors: Jianqiang Shen, Santa Clara, CA (US); Masafumi Suzuki, Mountain View, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 295 days.

(21) Appl. No.: 14/225,241

(22) Filed: Mar. 25, 2014

(65) Prior Publication Data

US 2015/0281162 A1  Oct. 1, 2015

(51) Int. Cl.
| | |
|---|---|
| G06F 15/16 | (2006.01) |
| H04M 3/42 | (2006.01) |
| G06F 17/30 | (2006.01) |
| G06F 15/173 | (2006.01) |
| G06F 9/46 | (2006.01) |
| G06F 11/30 | (2006.01) |
| H04W 4/00 | (2009.01) |
| G06F 7/00 | (2006.01) |
| H04L 12/58 | (2006.01) |
| H04L 29/08 | (2006.01) |
| G10L 15/06 | (2013.01) |
| G10L 15/08 | (2006.01) |

(52) U.S. Cl.
CPC ............ *H04L 51/26* (2013.01); *G10L 15/063* (2013.01); *G10L 15/08* (2013.01); *H04L 51/12* (2013.01); *H04L 51/24* (2013.01); *H04L 67/22* (2013.01); *H04L 67/322* (2013.01); *H04L 51/063* (2013.01)

(58) Field of Classification Search
CPC ...... H04L 51/26; H04L 51/14; G08G 1/09675
USPC ......................................... 709/206, 203, 201
See application file for complete search history.

(56) References Cited

U.S. PATENT DOCUMENTS

| | | | | |
|---|---|---|---|---|
| 5,377,354 A | * | 12/1994 | Scannell | .................. H04L 51/22 706/45 |
| 5,845,207 A | * | 12/1998 | Amin | ....................... H04W 4/16 455/414.1 |
| 6,732,273 B1 | * | 5/2004 | Byers | .................... G06Q 10/107 713/193 |
| 2003/0046421 A1 | * | 3/2003 | Horvitz | ................ G06Q 10/107 709/238 |
| 2009/0117922 A1 | * | 5/2009 | Bell | .................. H04M 1/72552 455/466 |
| 2009/0132662 A1 | * | 5/2009 | Sheridan | .............. G06Q 10/107 709/206 |

(Continued)

*Primary Examiner* — Phuoc Nguyen
*Assistant Examiner* — Kishin G Belani
(74) *Attorney, Agent, or Firm* — Shun Yao; Park, Vaughan, Fleming & Dowler LLP

(57) ABSTRACT

The system facilitates the selective display of messages to a user while the user is driving a vehicle. During operation, the system determines the priority of a message based on: a sender of the message; whether the message requests a response; a duration of time within which to read the message; and one or more rules. The system precludes the display of one or more messages while the user is driving a vehicle based on the respective priority of the messages.

21 Claims, 8 Drawing Sheets

(56) References Cited

U.S. PATENT DOCUMENTS

| | | | | |
|---|---|---|---|---|
| 2012/0023113 A1* | 1/2012 | Ferren | ............... | G06F 17/30867 |
| | | | | 707/751 |
| 2012/0323933 A1* | 12/2012 | He | ....................... | G06Q 10/109 |
| | | | | 707/749 |
| 2013/0212185 A1* | 8/2013 | Pasquero | ............. | G06Q 10/107 |
| | | | | 709/206 |

* cited by examiner

US 9,654,437 B2

SYSTEM AND METHOD FOR PRIORITIZING MESSAGES BASED ON SENDERS AND CONTENT FOR DRIVERS

RELATED APPLICATION

The subject matter of this application is related to the subject matter of U.S. patent application Ser. No. 13/459,875, entitled "METHOD AND SYSTEM FOR CALCULATING IMPORTANCE OF COMMUNICATION PARTICIPANTS," having publication number 20130289939 and filing date Apr. 30, 2012, and U.S. patent application Ser. No. 13/253,895, entitled "METHOD AND SYSTEM FOR CALCULATING EMAIL AND EMAIL PARTICIPANT PROMINENCE," having publication number 20130091226 and filing date Oct. 5, 2011, the disclosures of which are incorporated by reference herein.

BACKGROUND

Field

This disclosure is generally related to the selective display of messages. More specifically, this disclosure is related to prioritizing messages based on various factors such as the sender and content of the messages for display of the messages to a user who is driving a vehicle.

Related Art

The proliferation of digital information has created a world in which humans encounter and process an overwhelming amount of information. This information can take the form of electronic messages, notifications, push notifications, text messages, and messages via any type of digital device, both traditional and mobile.

Processing this amount of information can be especially challenging for people when conditions allow only a brief time window during which to process such information. For example, as a driver of a car, motorcycle, or other vehicle, the focus is on driving the vehicle in order to maintain the necessary safety precautions. Thus, a driver spends most of his time watching the road or space ahead and around him, and may have limited periods of time within which to check a message. Such time windows could include stopping at a red light. However, a system which displays all of the available messages during these time windows simply displays the messages without taking into account factors such as the sender and content of the message. The driver is thus faced with many messages to read and process during a short window of time and may not be able to do so successfully. Unfortunately, some messages which are more important than others may not get read by the driver due to time or the arrangement of the message within the display of the user.

SUMMARY

One embodiment provides a system for selectively displaying messages to a user. During operation, the system determines the priority of a message based on: a sender of the message; whether the message requests a response; a duration of time within which to read the message; and one or more rules. The system precludes the display of one or more messages while the user is driving a vehicle based on the respective priority of the messages.

In some embodiments, the system operates to determine the priority of a message by combining the measures of the priority determined based on the sender of the message, whether the message requests a response, the duration of time within which to read the message, and one or more rules. The priority of the message is determined based on using a weighted score for each of the respective measures of the priority of the message based on predetermined multipliers. The priority of the message may also be determined based on other methods, such as using a decision tree with branches which check conditions based on a predetermined threshold.

In some embodiments, the system determines the priority of the message based on the sender of the message by calculating a perceived priority of a communication pattern of the user.

In some embodiments, the system determines the priority of the message based on whether the message requests a response. The system operates by training a speech predictor to predict speech acts from the message, where the speech predictor is trained from a collection of messages using machine learning methods. The system then scores the message using the speech predictor.

In some embodiments, the system determines the priority of the message based on the duration of time within which to read the message by counting the number of words in the message.

In some embodiments, the system determines the priority of the message based on one or more rules. The system determines an overall score for the rules. Each rule contains a condition and a predetermined score corresponding to the condition. The conditions of the rule comprise one or more of: whether a particular sender is associated with the message; whether a particular word appears within the message; and whether a sentence contains two particular words in a particular order. If the conditions of the rule are present, the method further comprises determining the overall score for the rules by adding up the predetermined scores corresponding to the conditions of the rule.

In another embodiment, the system determines whether the user is an intended recipient of the message. If the user is not an intended recipient of the message, the system decreases the priority of the message.

In some embodiments, the system partitions the messages into sentences and determines the priority of each sentence. In another embodiment, the system selects for display the sentences with a priority greater than a predetermined threshold. In another embodiment, the system selects for display all of the sentences, regardless of their priority, and further displays in color the sentences with a priority greater than a predetermined threshold.

In another embodiment, the system displays the messages to the user by summarizing the message to display, based on the respective priority of the sentences within each message. During operation, displaying the summary can comprise one or more of: sorting the sentences based on their priority; determining a total character capacity of the display; determining a character count of each sorted sentence; selecting the sentences with the highest priority, where the summation of the character count of the selected sentences is equal to or less than the total character capacity of the display; ordering the selected sentences whose character count summation falls below the total character capacity of the display; and displaying the ordered sentences on the display of the user.

BRIEF DESCRIPTION OF THE FIGURES

In the figures, like reference numerals refer to the same figure elements.

DETAILED DESCRIPTION

Figure 1A:
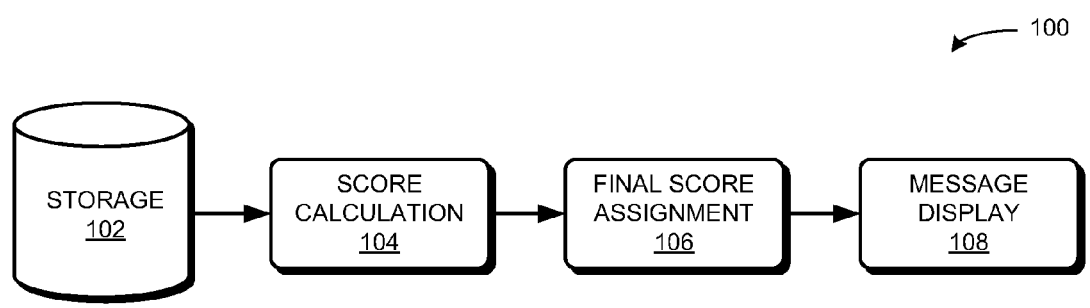
FIG. 1A illustrates an exemplary framework for the selective display of messages to a user, in accordance with the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for selectively displaying messages to a user while the user is driving a vehicle. The system operates by determining the priority of a message based on several factors, including the sender of the message, whether the message requests a response, the duration of time within which to read the message, and one or more rules. In order to determine the priority of the message, the system determines a priority or score for each of these factors ("SenderScore", "SpeechActScore", "DurationScore", and "RuleScore") and combines the measures of priority for each factor. The priority of the message may be determined based on a method which uses a weighted score for each of the respective measures of the priority of the message based on predetermined multipliers. Determining the priority of the message may also be based on using a decision tree with branches which check conditions based on a predetermined threshold.

The system can also partition the messages into sentences, and then determine the priority of each sentence based on two factors: whether the message requests a response; and one or more rules (SpeechActScore and RuleScore). During operation, the system calculates the final score for the sentence by using a comparison method, where the greater of the SpeechActScore and the RuleScore is selected as the final score for the sentence. The system can also use a variety of other methods to calculate the final score, including an average value method, a weighted sum method, or a decision tree model. Subsequently, the system displays the sentences based on the final calculated score.

Upon determining which sentences to display, the system can display all of the sentences with a score greater than a predetermined threshold. The system can also highlight key content for the user by displaying all of the sentences regardless of their score, and further displaying in color the sentences with a score greater than the predetermined threshold.

Another way to highlight key content involves first sorting the sentences based on their priority and then displaying all of the sentences with the highest priorities which will fit onto the display of the user. In other words, the system determines the total character capacity of the display of the user and also determines the character count of the sorted sentences. The sentences are then ordered in the order in which they appear in the message, and the ordered sentences are then displayed on the display of the user. In this way, the most important sentences of the message are displayed to the user, and the original order of the sentences is also maintained.

FIG. 1A illustrates an exemplary framework 100 for the selective display of messages to a user, in accordance with the present invention. Various messages reside in a storage 102. The messages are sent to a score calculation module 104, which determines the priority or score of the message. A final score assignment module 106 then calculates and assigns the overall priority or score of the message. Based on the calculated scores and the various measures being considered, a message display module 108 precludes the display of one or more messages to a user while the user is driving a vehicle. In this manner, and based on their respective priorities, certain messages are selectively displayed to a user while the user is driving a vehicle during the brief time windows that are available to the user for reading a message.

Figure 1B:
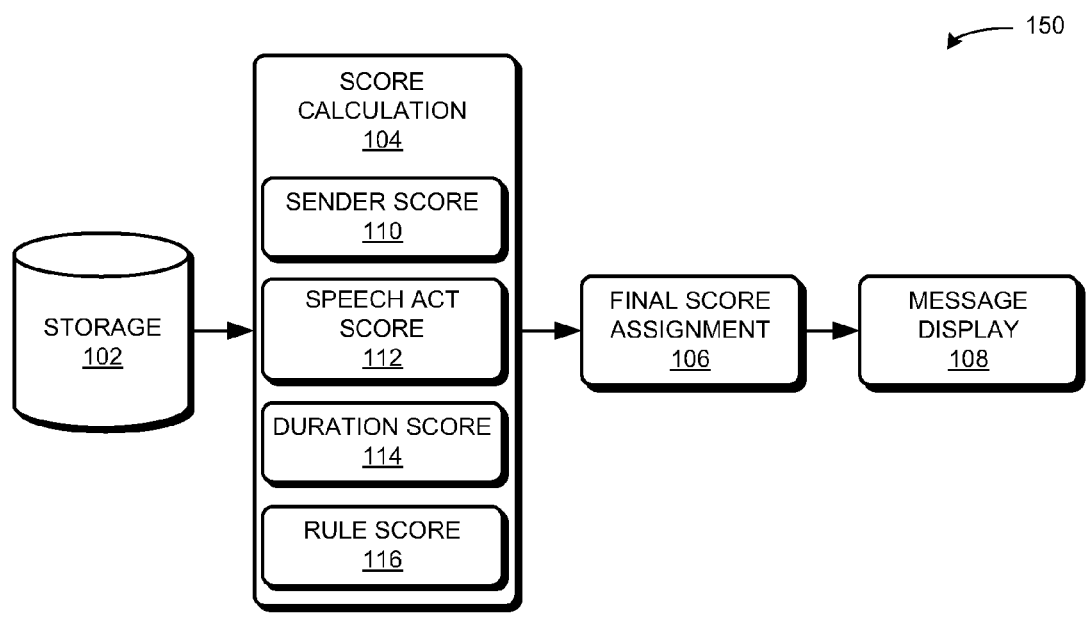
FIG. 1B illustrates an exemplary framework for the selective display of messages to a user, based on various factors, in accordance with the present invention.

FIG. 1B illustrates an exemplary framework 150 for the selective display of messages to a user, in accordance with the present invention. Various messages reside in storage 102. The messages are sent to the score calculation module 104, which calculates various measures based on a sender score module 110, a speech act score module 112, a duration score module 114, and a rule score module 116. Based on the scores determined from these modules, the system determines the priority of the message by combining the scores from the measures and using either a weighted score method or a decision tree method to obtain the overall priority of the message (final score assignment module 106). The weighted score method involves assigning a predetermined multiplier for each of the respective measures, and the decision tree method uses branches which check conditions based on a predetermined threshold. Based on the overall score obtained from the final score assignment module 106, the message display module 108 precludes the display of one or more messages to a user while the user is driving a vehicle. Certain high priority messages are thus selectively displayed to the user during the available time windows.

Figure 2:
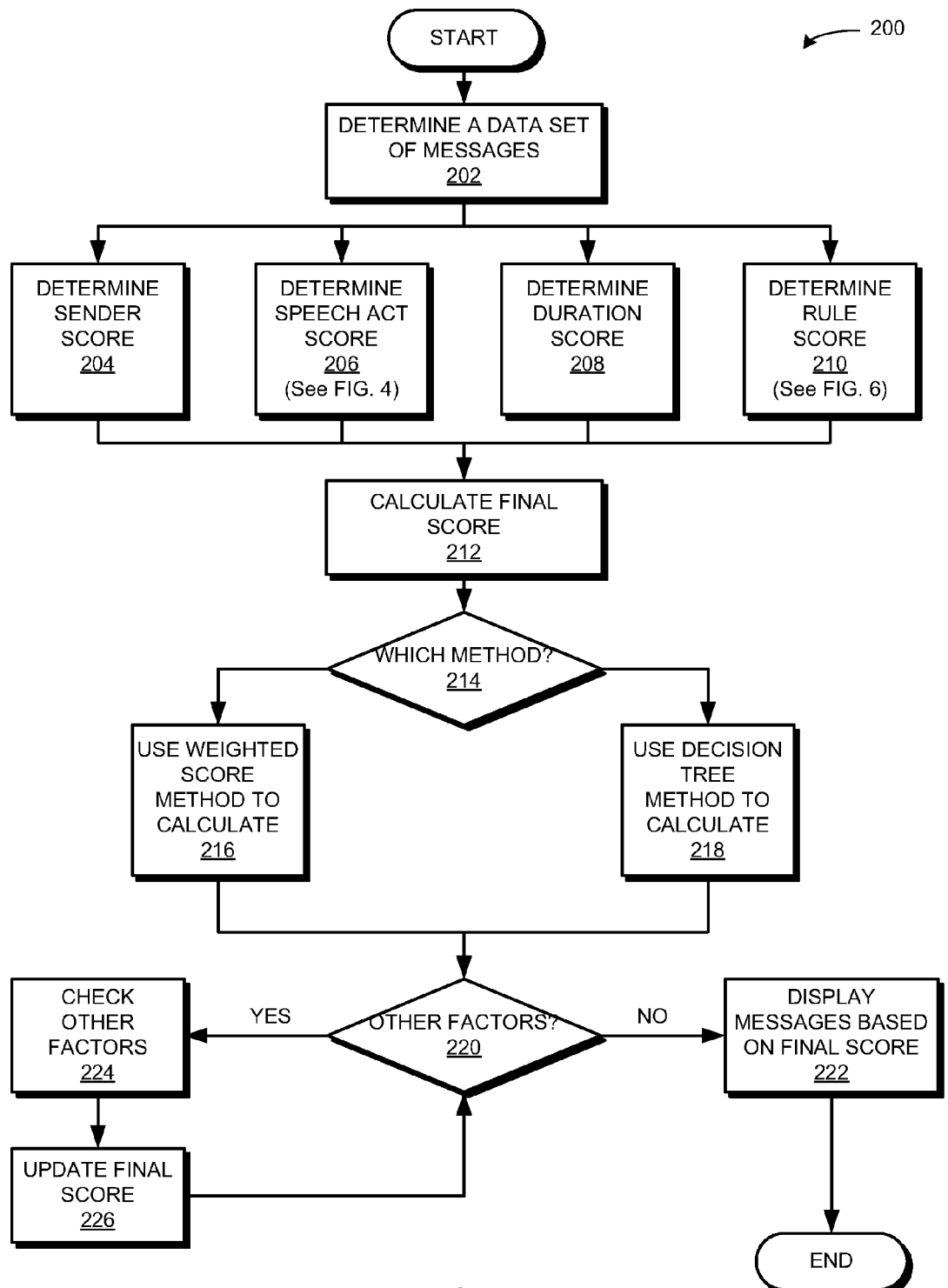
FIG. 2 presents a flowchart illustrating a method for selectively displaying messages to a user, in accordance with the present invention.

FIG. 2 presents a flowchart 200 illustrating a method for selectively displaying messages to a user, in accordance with the present invention. The system determines a data set of messages on which to calculate priorities for selective display (operation 202). The system then considers several factors and calculates a score for each factor. The system determines the priority of the message based on the sender by calculating a perceived priority of a communication pattern of the user (operation 204). This perceived priority value is referred to as the "SenderScore." The details for calculating this perceived priority can be found in related applications U.S. Patent Pub. No. 20130289939 and U.S. Patent Pub. No. 20130091226, the disclosures of which are incorporated by reference herein.

The system determines the priority of the message based on whether the message requests a response (operation 206). This calculation is performed by training a speech predictor to predict speech acts from the message, and then scoring the message using the speech predictor. This value is referred to as the "SpeechActScore."

The system also determines the priority of a message based on the duration of time within which to read the message by counting the number of words in the message (operation 208), based on a sigmoid function such as: $0.5/(1+e^{7.0*(c/100-0.6)})+0.5$, where c is the count of words in the message, e is the base of the natural logarithm, and $e^x$ calculates the exponential value of x. This value is referred to as the "DurationScore."

The system further determines the priority of the message based on one or more rules, where each rule contains a condition and a predetermined score corresponding to the condition, such that if the conditions of the rule are present, the system determines the overall score for the rules by summing up the predetermined scores corresponding to the triggered rules (operation 210). This value is referred to as the "RuleScore."

Subsequently, the system uses the score from each considered factor (SenderScore, SpeechActScore, DurationScore, and RuleScore) to calculate the final score or determine the overall priority of the message (operation 212). The system determines a specific method to use to calculate the final score based on the measures from each considered factor (decision 214). In one embodiment, the system uses a weighted score for each of the respective factors based on predetermined multipliers. For example, using the weighted score method on the above four factors yields:
$w_1$*SenderScore+$w_2$*SpeechActScore+$w_3$*DurationScore+$w_4$*RuleScore.
An example of possible weights is: $w_1$=0.35, $w_2$=0.65*3, $w_3$=0.65*0.2, $w_4$=0.65*0.5.

Figure 3:
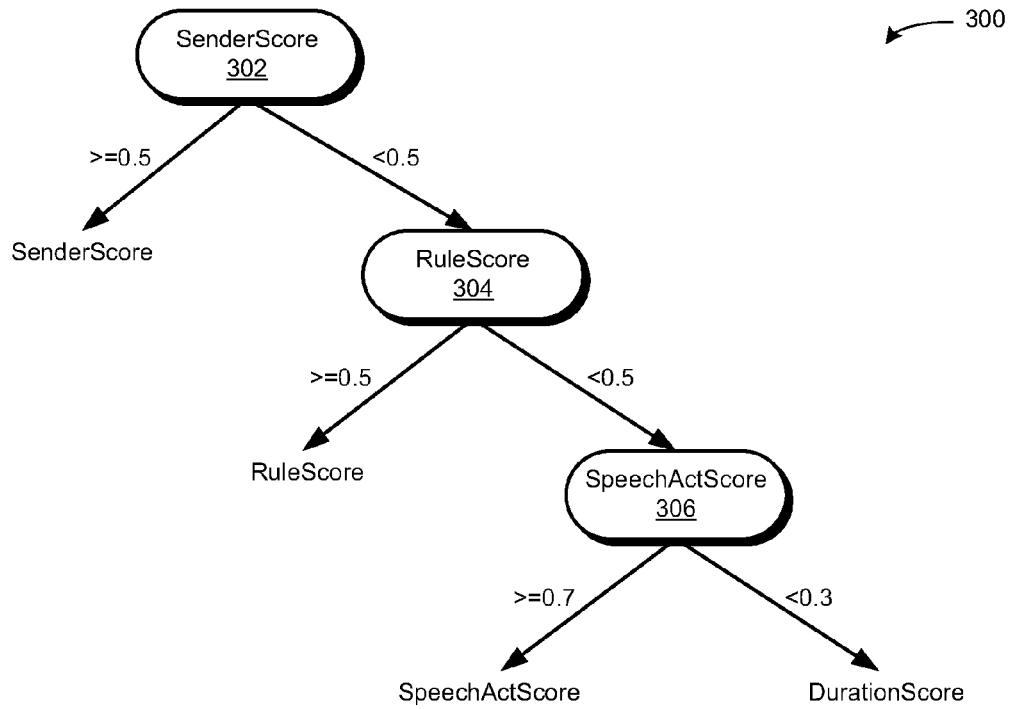
FIG. 3 illustrates an exemplary decision tree with branches which check conditions, in accordance with the present invention.

In a further embodiment, the system uses a decision tree to determine the final score. FIG. 3 illustrates an exemplary decision tree 300 which depicts branches that check various predetermined conditions. If the SenderScore 302 is greater than or equal to 0.5, then the system will use the SenderScore 302 as the final score to indicate the priority of the message. If the SenderScore 302 is less than 0.5, then the system checks the RuleScore 304. If the RuleScore 304 is greater than or equal to 0.5, then the system will use the RuleScore 304 as the final score to determine the priority of the message. If the RuleScore 304 is less than 0.5, then the system checks the SpeechActScore 306. If the SpeechActScore 306 is greater than or equal to 0.7, then the system will use the SpeechActScore 306 as the final score to determine the priority of the message. If the SpeechActScore 306 is less than 0.3, then the system will use the DurationScore as the final score to determine the priority of the message. Decision tree 300 is one example of a possible decision tree, and contains condition checking branches based on the SenderScore 302, the RuleScore 304, and the SpeechActScore 306. Decision trees with branches checking other various conditions or performing calculations are also possible.

Returning to FIG. 2, once the system has calculated the final score (operation 212) by using a specific method (operation 216 or operation 218), the system checks if there are any other factors to be considered (operation 220). If there are any other factors to consider, the system checks the other factors (operation 224). In one embodiment, one example of such a factor is whether the driver is the intended recipient of the message. In other words, the system checks to see whether the driver is the direct target of the message by determining whether the driver is in the "TO" list or in the "CC/BCC" list. If the driver is not in the "TO" list, then the driver is not considered to be a direct target of the message. Thus, if the driver is not the intended recipient of the message, the system subtracts a predetermined constant value from the final score. Or, the system can multiply the final score by a predetermined constant value (between 0 and 1). Based on this result, the system updates the final score (operation 226). The system continues to check for other factors until there are no other factors left to consider (decision 220). When there are no longer any factors left to consider, the system selectively displays the messages based on the final score (operation 222), by precluding the display of certain messages that do not have a high priority and by displaying the messages which have a high priority.

Determining Priority Based on Specific Factors

This section details how the system determines the priority of a message based on specific measures, including the sender of the message (SenderScore), whether the message requests a response (SpeechActScore), the duration of time within which to read the message (DurationScore), and one or more rules (RuleScore).

The system determines the priority of the message based on the sender (SenderScore) by calculating a perceived priority of a communication pattern of the user (operation 204). The calculation is based on communication patterns across multiple communication channels, social networks, and contexts. The returned value is binary, where a value of 1 is considered important and a value of 0 is considered not important. As mentioned above, the details for calculating this perceived priority can be found in related applications U.S. Patent Pub. No. 20130289939 and U.S. Patent Pub. No. 20130091226.

Figure 4:
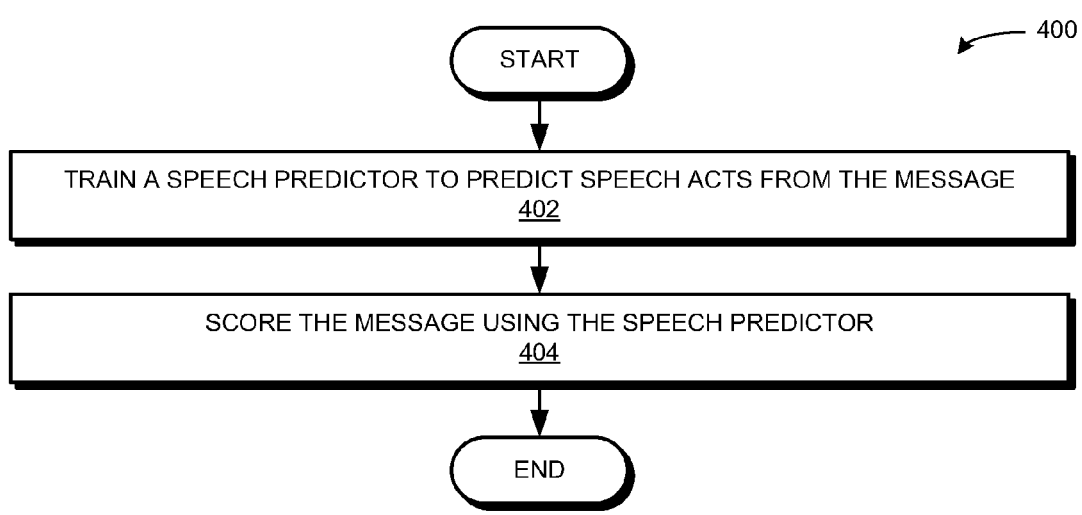
FIG. 4 presents a flowchart illustrating a method for determining the priority of a message based on whether the message requests a response, in accordance with the present invention.

FIG. 4 presents a flowchart 400 illustrating a method for determining the priority of a message based on whether the message requests a response (SpeechActScore). To provide some context, in the general scheme of messages, it is to be understood that one important activity is the negotiation and delegation of shared tasks and subtasks. Therefore, in ascertaining the purpose of the message, the system may determine whether the message contains a request, a commitment by the sender to perform some task, or an amendment to an earlier proposal. A known classification is the speech act taxonomy, a classification which typically divides on object (a message) into verbs and nouns, where each object (message) is represented by one or more verb-noun pairs. For example, an email proposing a meeting would have the labels "Propose" and "Meeting." The most common speech acts verbs are "Deliver", "Request", "Commit", and "Propose." The most common speech act nouns are "Meeting" and "Data."

One embodiment of the present invention trains a speech predictor to predict these speech acts from the message (operation 402). The speech predictor is trained from a collection of messages using machine learning methods. The collection of messages can be a large email dataset or any other set of like objects, while the machine learning methods can be performed by support vector machines. The speech predictor uses features including but not limited to the following known methods: bag-of-words in both unigram and bigram; part-of-speech tags; person-name patterns which are captured by regular expressions; and time patterns which are captured by regular expressions. The speech predictor gives higher priority to messages which require immediate action from the user. For example, if a message contains a Request or Propose label, then the speech predictor would score the message with a high priority. Based on these features, the system scores the message using the speech predictor (operation 404) and returns the SpeechActScore as the priority of the message.

Figure 5:
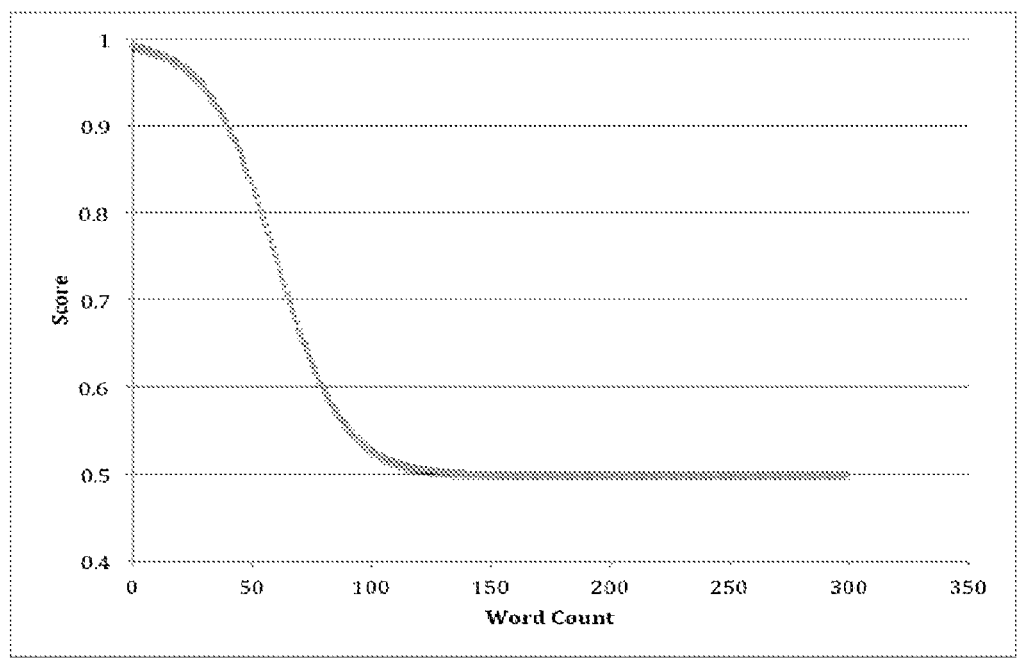
FIG. 5 presents a graph which depicts a calculation used to determine the priority of a message based on the duration of time within which to read the message, in accordance with the present invention.

The system also determines the priority of the message based on the duration of time within which to read the message (DurationScore). Typically, a user who is driving a vehicle will have only a limited amount of time within which to read a message. Thus, the system assigns a higher score to shorter messages. The determination of how much time a user needs to read a message can depend upon various factors, including the count of the number of the words, the difficulty of the words, and the complexity of the sentence structure. In one embodiment of the present invention, the system estimates the reading time by counting the number of words. As discussed above, the DurationScore is calculated based on a sigmoid function such as: $0.5/(1+e^{7.0*(c/100-0.6)}) + 0.5$, where c is the count of words in the message, e is the base of the natural logarithm, and $e^x$ calculates the exponential value of x. A table demonstrating this calculation is shown in FIG. 5. The x-axis represents the count of the number of words in the message, while the y-axis represents the score as a value between 0 and 1. As seen in FIG. 5, a message with very few words corresponds to a high score. As the count of words increases, the score decreases. After the count of words reaches a threshold, the score levels off such that the system continues to assign similar scores. In other words, if a message is longer than a certain number of words, the decrease in the score after that point is irrelevant to the user because the user would likely not be able to finish reading the message. Hence, the DurationScore is returned with a value between 0 and 1.

Figure 6:
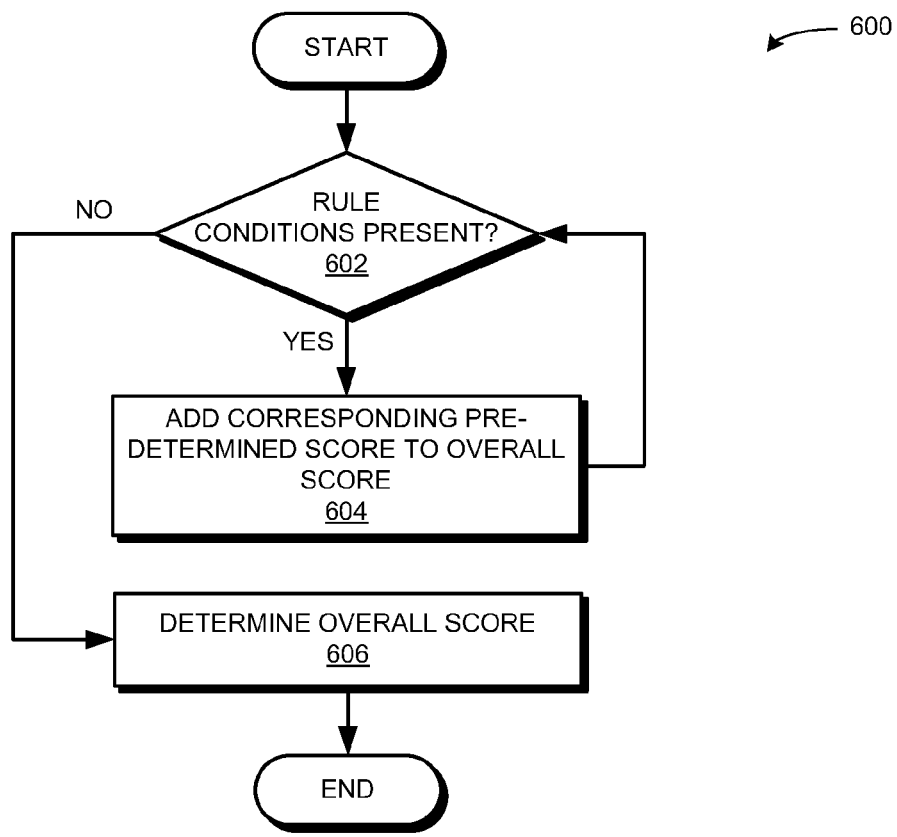
FIG. 6 presents a flowchart illustrating a method for determining the priority of a message based on one or more rules, in accordance with the present invention.

The system also determines the priority of the message based on one or more rules (RuleScore). These rules can be set by the system before operation of the system begins. This provides the user with some flexibility in terms of scoring the messages. The rules are comprised of a set of conditions and a corresponding predetermined score. If the conditions of the rule are present, then the system adds the corresponding score to the overall score to determine the priority of the message. FIG. 6 presents a flowchart 600 illustrating a method to determine the priority of the message based on one or more rules. The system checks to see if any of the rule conditions are present (decision 602). If the system detects any rule conditions, then it adds the corresponding score for the triggered rule to the overall RuleScore (operation 604). The system then repeats this process until there are no more rule conditions present, and determines the overall score, which is comprised of the sum of the predetermined scores corresponding to the conditions of all of the triggered rules (operation 606). If the overall score is greater than 1, then the system caps and assigns the overall score as 1.

Partitioning and Scoring at the Sentence Level to Highlight Key Content

Figure 7:
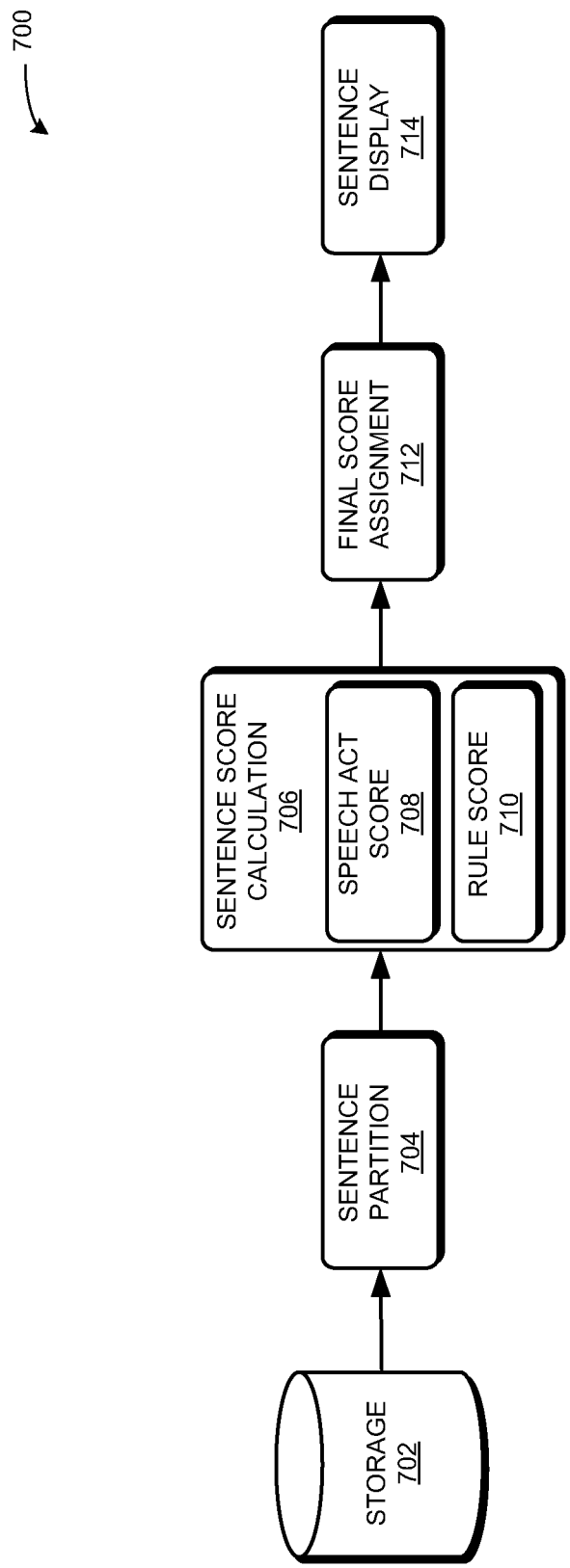
FIG. 7 illustrates an exemplary framework for the selective display of messages to a user, based on partitioning the messages into sentences, in accordance with the present invention.

Other embodiments of the system describe methods which are used to highlight key content within the messages. FIG. 7 illustrates an exemplary framework for the selective display of messages to a user, based on partitioning the messages into sentences, in accordance with the present invention. Various messages reside in a storage 702. The system performs a sentence partition module 704 and segments each message into sentences. A sentence score calculation module 706 then determines the priority of each sentence based on the speech act score module 708 and the rule score module 710. A final score assignment module 712 assigns the final score based on the sentence score calculation module 706. Finally, the system selectively displays various sentences of the message based on the final score as calculated in a sentence display module 714.

Figure 8:
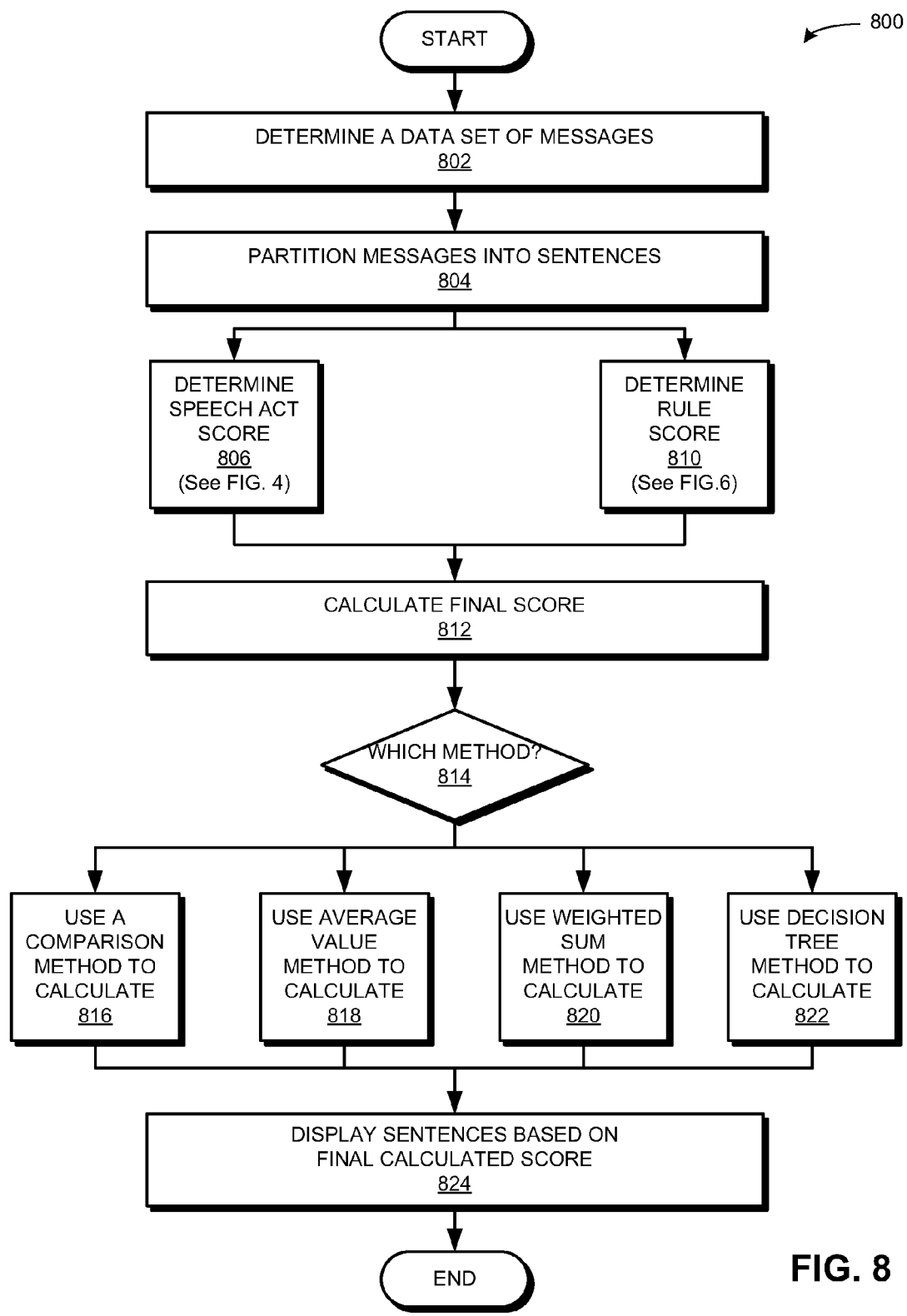
FIG. 8 presents a flow chart illustrating a method for selectively displaying messages to a user, by partitioning the messages into sentences, in accordance with the present invention.

FIG. 8 presents a flow chart 800 illustrating a method for selectively displaying messages to a user, by partitioning the messages into sentences, in accordance with the present invention. The system determines a data set of messages on which to calculate priorities for selective display (operation 802). The system then partitions the messages into sentences (operation 804) and, in one embodiment, considers the following factors: whether the message requests a response; and one or more rules. The system thus determines the SpeechActScore (operation 806) as well as the RuleScore (operation 810) of the sentence, which is the same in operation as described above in relation to FIGS. 4 and 6. The final score is calculated (operation 812) based on the SpeechActScore and the DurationScore. Various methods may be used to calculate the score when the system determines which method to use (decision 814). In one embodiment, the system compares the SpeechActScore to the DurationScore and selects the higher score among these two scores as the final score (operation 816). Other methods can include using an average value to calculate the final score (operation 818), a weighted sum method to calculate the final score (operation 820), and a decision tree method to calculate the final score (operation 822). Finally, the system selectively displays the sentences based on the final calculated score (operation 824).

Figure 9:
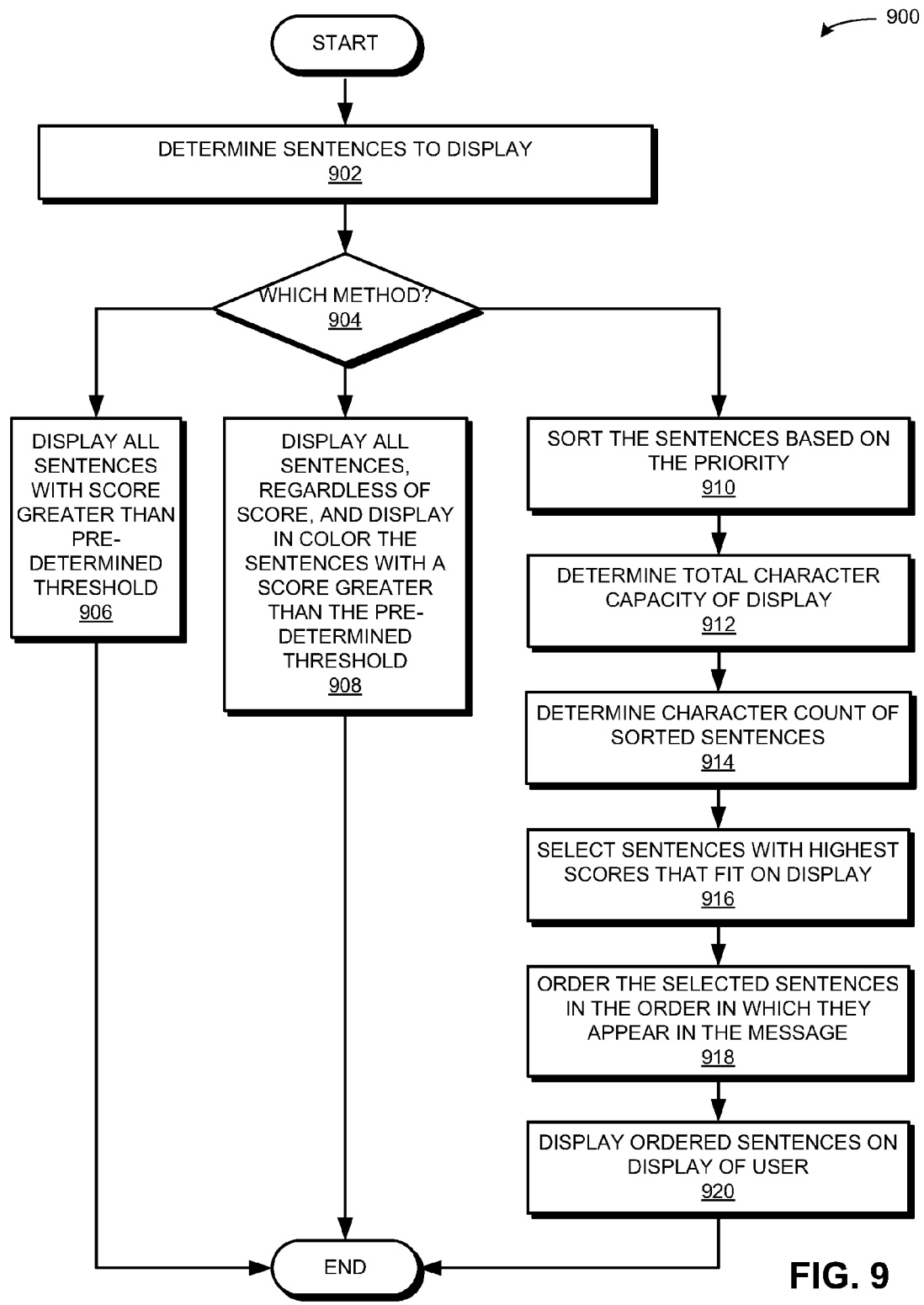
FIG. 9 presents a flow chart illustrating a method for displaying one or more messages based on the respective priority of the sentences within the messages, in accordance with an embodiment of the present invention.

The selection of which sentences to display is shown in FIG. 9, which presents a flow chart 900 illustrating a method for displaying one or more messages based on the respective priority of the sentences within the message. The system operates by determining which sentences to display (operation 902), based on the partitioning and scoring of sentences as described in FIG. 8. Then the system determines which method to use to display the scored sentences (operation 904). In one embodiment, the system displays all the sentences with a score greater than a predetermined threshold (operation 906). In another embodiment, the system displays all of the sentences of the message regardless of the score, but additionally highlights the sentences with scores greater than a predetermined threshold by displaying them in color on the display of the user (operation 908).

In another embodiment, upon determining the scores of the sentences, the system sorts the sentences based on their priority (operation 910). The system determines the total character capacity of the display of the user (operation 912) and also determines the character count of the sorted sentences (914). The system selects the sentences with the highest scores that will fit onto the display (operation 916).

In other words, the system selects the sentence with the highest score to display on the screen. If there is still room, the system selects the sentence with the second highest score to display on the screen. The system continues selecting sentences by priority until the sentence no longer fit on the display of the user. The system then orders the selected sentences into the order in which they originally appear in the message (operation 918) and then displays the ordered sentences on the display of the user (operation 920). In this manner, the system allows the critical sentences of a message to be displayed to the user in the order in which they appear in the message.

Computer and Communication System

Figure 10:
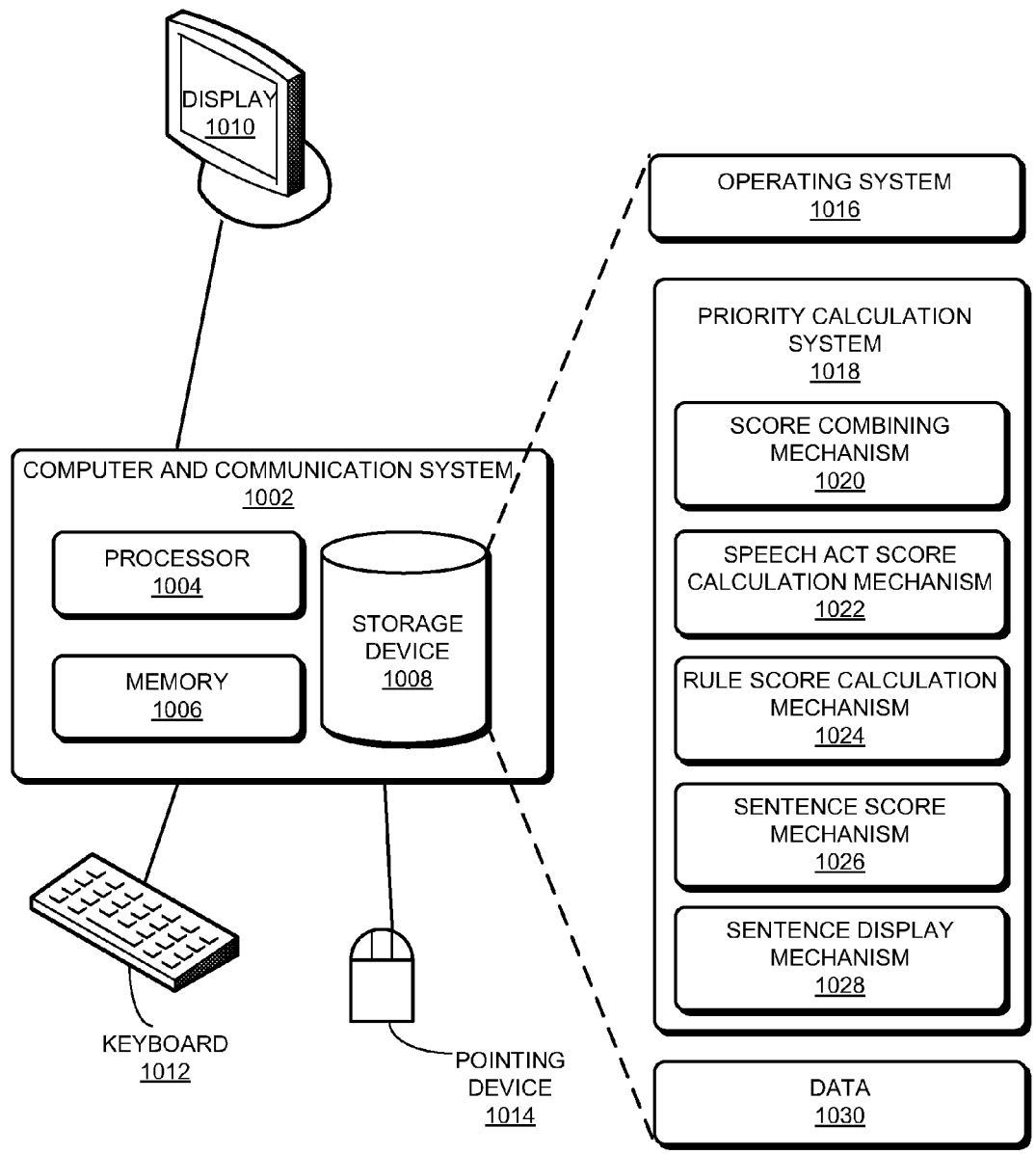
FIG. 10 illustrates an exemplary computer system that facilitates the selective display of messages to a user while the user is driving a vehicle, in accordance with an embodiment of the present invention.

FIG. 10 illustrates an exemplary computer and communication system 1002 that facilitates the selective display of messages to a user while the user is driving a vehicle, in accordance with an embodiment of the present invention. Computer and communication system 1002 includes a processor 1004, a memory 1006, and a storage device 1008. Memory 1006 can include a volatile memory (e.g., RAM) that serves as a managed memory, and can be used to store one or more memory pools. Furthermore, computer and communication system 1002 can be coupled to a display device 1010, a keyboard 1012, and a pointing device 1014. Storage device 1008 can store an operating system 1016, a priority calculation system 1018, and data 1030.

Priority calculation system 1018 can include instructions, which when executed by computer and communication system 1002, can cause computer and communication system 1002 to perform methods and/or processes described in this disclosure. Specifically, priority calculation system 1018 may include instructions for determining a priority of a message based on one or more of: a sender of the message; whether the message requests a response; a duration of time within which to read the message; and one or more rules. Priority calculation system 1018 can also include instructions for precluding the display of one or more messages based on the respective priority of the messages.

Priority calculation system 1018 can include instructions for determining the priority of the message by combining measures of priority which are determined based on the sender of the message, whether the message requests a response, the duration of time within which to read the message, and one or more rules (score combining mechanism 1020). Combining the measures may include using a weighted score for each of the respective measures of the priority of the message based on predetermined multipliers, and may also include using a decision tree with branches which check conditions based on a predetermined threshold (score combining mechanism 1020).

Priority calculation system 1018 can also include instructions for determining the priority of the message based on whether the message requests a response by training a speech predictor to predict speech acts from the message, where the speech predictor is trained from a collection of messages using machine learning methods (speech act score calculation mechanism 1022). Priority calculation system 1018 can also include instructions for scoring the message using the speech predictor (speech act score calculation mechanism 1022).

Priority calculation system 1018 can also include instructions for determining the priority of the message based on one or more rules, where each rule contains a condition and a predetermined score corresponding to the condition. The rules can comprise: whether a particular sender is associated with a message; whether a particular word appears within the message; whether a sentence contains two particular words in a particular order (rule score calculation mechanism 1024). Priority calculation system 1018 can also include instructions for determining the overall score for the rule by summing up the predetermined scores corresponding to the conditions of the rules when the conditions of any rule are present or are triggered (rule score calculation mechanism 1024).

Priority calculation system 1018 can also include instructions for determining whether the user is an intended recipient of the message, and responsive to determining that the user is not an intended recipient of the message, decreasing the priority of the message.

In addition, priority calculation system 1018 can include instructions for partitioning the messages into sentences and determining the priority of each sentence (sentence score mechanism 1026). Priority calculation system 1018 can include instructions to display the sentences whose priority is greater than a predetermined threshold and to display all of the sentences, regardless of their priority, where the sentences with a priority greater than a predetermined threshold are displayed in color (sentence display mechanism 1028). Priority system 1018 can also include instructions for displaying the messages based on the respective priority of the messages by summarizing the messages to display to the user by sorting the sentences based on their priority, determining a total character capacity of the display of the user, determining a character count of each sorted sentence, selecting the sentences with the highest priority where the summation of the character count of the selected sentences is equal to or less than the total character capacity of the display, ordering the selected sentences in the order in which they appear in the message, and displaying the ordered sentences on the display of the user (sentence display mechanism 1028).

Data 1030 can include any data that is required as input or that is generated as output by the methods and/or processes described in this disclosure. Specifically, data 1030 can store at least: the messages on which to determine priorities; various factors relating to the messages, including the sender of the message, whether the message requests a response, a duration of time within which to read the message, and one or more rules containing conditions and corresponding predetermined scores; the priority or score relating to these various factors; the combination of the scores based on various methods; the sentences comprising the message; the priority or score relating to the sentences; the character count of the display of the user; the character count of the sentences; and other related data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for selectively displaying messages to a user, the method comprising:
   determining a priority of a message based on:
      a sender of the message;
      whether the message requests a response, wherein determining the priority of the message based on whether the message requests a response involves training a speech predictor to predict speech acts from the message;
      a duration of time within which the user can read the message while driving a vehicle; and
      one or more rules;
   responsive to determining that the user is not an intended recipient of the message, decreasing the priority of the message; and
   precluding display of one or more messages while the user is driving the vehicle based on the respective priority of the messages.

2. The method of claim 1, wherein determining the priority of the message further comprises using a weighted score for each of the respective measures of the priority of the message based on predetermined multipliers.

3. The method of claim 1, wherein determining the priority of the message based on the sender of the message further comprises calculating a perceived priority of a communication pattern of the user.

4. The method of claim 1, wherein the speech predictor is trained from a collection of messages using machine learning methods, and wherein determining the priority of the message based on whether the message requests a response further comprises:
   scoring the message using the speech predictor.

5. The method of claim 1, wherein determining the priority of the message based on the duration of time within which the user can read the message while driving the vehicle further comprises counting the number of words in the message.

6. The method of claim 1, wherein determining the priority of the message based on the one or more rules further comprises determining an overall score for the rules, wherein each rule contains a condition and a predetermined score corresponding to the condition, and wherein the conditions of the rules comprise one or more of:
   whether a particular sender is associated with the message;
   whether a particular word appears within the message; and
   whether a sentence contains two particular words in a particular order; and
   wherein if the conditions of the rules are present, the method further comprises determining the overall score for the rules by summing up the predetermined scores corresponding to the conditions of the rules.

7. The method of claim 1, further comprising:
   determining whether the user is an intended recipient of the message.

8. The method of claim 1, further comprising:
   partitioning the message into sentences; and
   determining the priority of each sentence.

9. The method of claim 8, further comprising displaying one or more messages based on the respective priority of the messages by one or more of:
   displaying the sentences whose priority is greater than a predetermined threshold; and
   displaying all of the sentences, regardless of their priority, wherein the sentences with a priority greater than a predetermined threshold are displayed in color.

10. The method of claim 8, further comprising displaying one or more messages based on the respective priority of the messages by summarizing the messages to display to the user, which comprises one or more of:
    sorting the sentences based on their priority;
    determining a total character capacity of a display;
    determining a character count of each sorted sentence;
    selecting the sentences with the highest priority, wherein the summation of the character count of the selected sentences is equal to or less than the total character capacity of the display;
    ordering the selected sentences in the order in which they appear in the message; and
    displaying the ordered sentences on the display of the user.

11. A non-transitory computer-readable storage medium storing instructions that when executed by a computer cause the computer to perform a method for selectively displaying messages to a user, the method comprising:
    determining a priority of a message based on:
       a sender of the message;
       whether the message requests a response, wherein determining the priority of the message based on whether the message requests a response involves training a speech predictor to predict speech acts from the message;
       a duration of time within which the user can read the message while driving a vehicle; and
       one or more rules,
       wherein determining the priority of the message comprises combining measures of the priority determined based on the sender of the message, whether the message requests a response, the duration of time within which to read the message, and the one or more rules, and
       wherein determining the priority of the message further comprises using a decision tree with branches which check each of the respective measures of the priority of the message against conditions based on a predetermined threshold;
    responsive to determining that the user is not an intended recipient of the message, decreasing the priority of the message; and
    precluding display of one or more messages while the user is driving the vehicle based on the respective priority of the messages.

12. The storage medium of claim 11, wherein determining the priority of the message further comprises using a weighted score for each of the respective measures of the priority of the message based on predetermined multipliers.

13. The storage medium of claim 11, wherein determining the priority of the message based on the sender of the message further comprises calculating a perceived priority of a communication pattern of the user.

14. The storage medium of claim 11, wherein the speech predictor is trained from a collection of messages using machine learning methods, and wherein determining the priority of the message based on whether the message requests a response further comprises:
scoring the message using the speech predictor.

15. The storage medium of claim 11, wherein determining the priority of the message based on the duration of time within which the user can read the message while driving the vehicle further comprises counting the number of words in the message.

16. The storage medium of claim 11, wherein determining the priority of the message based on the one or more rules further comprises determining an overall score for the rules, wherein each rule contains a condition and a predetermined score corresponding to the condition, and wherein the conditions of the rules comprise one or more of:
whether a particular sender is associated with the message;
whether a particular word appears within the message; and
whether a sentence contains two particular words in a particular order; and
wherein if the conditions of the rules are present, the method further comprises determining the overall score for the rules by summing up the predetermined scores corresponding to the conditions of the rules.

17. The storage medium of claim 11, further comprising:
determining whether the user is an intended recipient of the message.

18. The storage medium of claim 11, further comprising:
partitioning the message into sentences; and
determining the priority of each sentence.

19. The storage medium of claim 18, further comprising displaying one or more messages based on the respective priority of the messages by one or more of:
displaying the sentences whose priority is greater than a predetermined threshold; and
displaying all of the sentences, regardless of their priority, wherein the sentences with a priority greater than a predetermined threshold are displayed in color.

20. The storage medium of claim 18, further comprising displaying one or more messages based on the respective priority of the messages by summarizing the messages to display to the user, which comprises one or more of:
sorting the sentences based on their priority;
determining a total character capacity of a display;
determining a character count of each sorted sentence;
selecting the sentences with the highest priority, wherein the summation of the character count of the selected sentences is equal to or less than the total character capacity of the display;
ordering the selected sentences in the order in which they appear in the message; and
displaying the ordered sentences on the display of the user.

21. A computer system to selectively display messages to a user, comprising:
a processor;
a storage device coupled to the processor and storing instructions that when executed by a computer cause the computer to perform a method, the method comprising:
determining a priority of a message based on:
a sender of the message;
whether the message requests a response, which involves training a speech predictor to predict speech acts from the message;
a duration of time within which the user can read the message while driving a vehicle; and
one or more rules,
wherein determining the priority of the message comprises combining measures of the priority determined based on the sender of the message, whether the message requests a response, the duration of time within which to read the message, and the one or more rules, and
wherein determining the priority of the message further comprises using a decision tree with branches which check each of the respective measures of the priority of the message against conditions based on a predetermined threshold;
responsive to determining that the user is not an intended recipient of the message, decreasing the priority of the message; and
precluding display of one or more messages while the user is driving the vehicle based on the respective priority of the messages.

* * * * *